United States Patent
Jonsson et al.

(10) Patent No.: US 6,690,939 B1
(45) Date of Patent: Feb. 10, 2004

(54) INCREASED RADIO COMMUNICATION CAPACITY USING TRANSMIT POWER BALANCING

(75) Inventors: Nils T. E. Jonsson, Luleå (SE); Staffan E. Johansson, Luleå (SE); Kurt S. Hansson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 232 days.

(21) Appl. No.: 09/663,934

(22) Filed: Sep. 18, 2000

(51) Int. Cl.[7] ................................................ H04Q 7/20
(52) U.S. Cl. ........................ 455/453; 455/452; 370/331
(58) Field of Search ................................ 455/453, 436, 455/438, 440, 442, 445, 452; 370/330, 331, 335

(56) References Cited

U.S. PATENT DOCUMENTS

| | | | |
|---|---|---|---|
| 5,487,174 A | | 1/1996 | Persson .......................... 556/1 |
| 5,623,484 A | * | 4/1997 | Muszynski ................... 370/335 |
| 5,781,861 A | | 7/1998 | Kang et al. ................... 465/435 |
| 5,884,187 A | | 3/1999 | Ziv et al. ...................... 455/522 |
| 5,912,884 A | * | 6/1999 | Park et al. .................... 370/331 |
| 5,915,219 A | | 6/1999 | Pöyhönen ..................... 455/453 |
| 6,052,584 A | * | 4/2000 | Harvey et al. ................ 455/423 |
| 6,069,883 A | * | 5/2000 | Ejzak et al. .................. 370/335 |
| 6,078,817 A | * | 6/2000 | Rahman .................... 455/452.1 |
| 6,134,444 A | * | 10/2000 | Kotzin ........................... 455/453 |
| 6,144,861 A | * | 11/2000 | Sundelin et al. ............. 455/522 |
| 6,381,458 B1 | * | 4/2002 | Frodigh et al. .............. 455/442 |
| 6,405,045 B1 | * | 6/2002 | Choi et al. .................... 455/453 |
| 6,456,850 B1 | * | 9/2002 | Kim et al. ..................... 455/453 |
| 6,463,044 B1 | * | 10/2002 | Seo .............................. 370/329 |
| 2002/0034951 A1 | * | 3/2002 | Salonaho et al. ............ 455/453 |
| 2002/0052206 A1 | * | 5/2002 | Longoni ....................... 455/453 |
| 2002/0055367 A1 | * | 5/2002 | Hamabe et al. .............. 455/522 |

FOREIGN PATENT DOCUMENTS

EP     0 892 570 A     1/1999

* cited by examiner

Primary Examiner—Nay Maung
Assistant Examiner—Tan Trinh
(74) Attorney, Agent, or Firm—Nixon & Vanderhye P.C.

(57) ABSTRACT

A transmit power load balancing technique in accordance with the present invention is used to increase the overall communication capacity of a radio communications system without incurring substantial, additional control signaling. An overloaded connection in a first cell serviced by a radio network is detected, and a second nearby cell which is not overloaded is identified. For a radio user node that has a connection with the radio network, radio transmission from the first overloaded cell is prevented or at least avoided in the downlink direction from the radio network to the radio user node. Instead, a radio transmission associated with that connection is established or otherwise permitted from the second cell in the downlink direction to the radio user node. In a preferred, non-limiting, example embodiment, the prevented or avoided downlink radio transmission is a traffic transmission. On the other hand, downlink control signaling associated with the connection from the first cell to the radio user node is permitted. Also, in the preferred example embodiment, radio transmissions from the radio user node to the first cell in the uplink direction are permitted, and preferably maintained, while transmissions in the downlink direction originate from the second cell.

31 Claims, 5 Drawing Sheets

INCREASED RADIO COMMUNICATION CAPACITY USING TRANSMIT POWER BALANCING

FIELD OF THE INVENTION

The present invention relates to radio communications, and in particular, to balancing cell loads in a cellular radio communications network.

BACKGROUND AND SUMMARY OF THE INVENTION

In a cellular communications system, a mobile radio station communicates over an assigned radio channel with one or more radio base stations. Several base stations are connected to a switching node which is typically connected to a gateway that interfaces the cellular communications system with other communication systems. A call placed from an external network to a mobile station is directed to the gateway, and from the gateway through one or more switching nodes to one or more base stations serving the called mobile station. The base station(s) pages the called mobile station and establishes a radio communications channel. A call originated by the mobile station follows a similar path in the opposite direction.

In a Code Division Multiple Access (CDMA) mobile communication system, spreading codes are used to distinguish information associated with different mobile stations or base stations transmitting over the same radio frequency band. In other words, individual radio "channels" correspond to and are discriminated on the basis of these codes. Various aspects of CDMA are set forth in one or more textbooks such as *Applications of CDMA and Wireless/Personal Communications*, Garg, Vijay K. et al., Prentice-Hall 1997.

Spread spectrum communications permit mobile transmissions to be received at two or more ("diverse") base stations and processed simultaneously to generate one received signal. With these combined signal processing capabilities, it is possible to perform a handover from one base station to another, (or from one antenna sector to another antenna sector connected to the same base station), without any perceptible disturbance in the voice or data communications. This kind of handover is typically called soft or diversity handover.

During diversity handover, the signaling and voice information from plural sources is combined in a common point with decisions made on the "quality" of the received data. In soft handover, as a mobile station involved in a call moves to the edge of a base station's cell, the adjacent cell's base station assigns a transceiver to the same call while a transceiver in the current base station continues to handle that call as well. As a result, the call is handed over on a make-before-break basis. Soft handover is therefore a process where two or more base stations handle the call simultaneously until the mobile station moves sufficiently close to one of the base stations which then exclusively handles the call. "Softer" handover occurs when the mobile station is in handover between two different antenna sectors connected to the same, multi-sectored base station using a similar make-before-break methodology.

Certain problems must be considered in a CDMA communications system. Because all users transmit information using the same frequency band at the same time, each user's communication interferes with the communications of the other users. Therefore, the power of radio transmitters in a CDMA system must be carefully controlled. Another problem is that the physical characteristics of a radio channel vary significantly. For example, the signal propagation loss between a radio transmitter and receiver varies as a function of their respective locations, obstacles, weather, etc. As a result, large differences may arise in the strength of signals received at a radio receiver from different radio transmitters. If the transmission power of a radio transmitter signal is too low, the receiver may not correctly decode a weak signal, and the signal will have to be corrected (if possible) or retransmitted. Accordingly, erroneous receipt of signals adds to congestion in a cell. Accordingly, a base station allocates desired transmit powers to downlink traffic channels, (i.e., base-to-mobile stations), so that the mobile stations receive the traffic information at an appropriate signal level. The transmit power allocated to such traffic channels may be adjusted to accommodate changing channel conditions resulting from movements of mobile stations, multipath propagation, weather, obstacles, and current interference level experienced in a cell. But the problem with increasing transmissions of one communication is that it adversely impacts other communications in the same cell or even adjacent cells by increasing the interference level for those other communications. Thus, the transmit power levels corresponding to those other communications may also be increased in response to the increased interference which further compounds the overall interference problem. When the traffic load in a particular cell among the plurality of cells in a mobile communications network exceeds an overload condition, (i.e., its capacity of traffic channels, traffic channel power, etc.), that cell is forced to block new mobile radio calls, or to even drop existing calls, in particularly severe overload conditions. In both cases, the system performance capacity is adversely impacted.

There is often a situation where two neighboring cells may have different traffic loads. The traffic load in one cell is too high, and the traffic load in a neighboring cell is substantially lower. Rather than have the overloaded cell reject calls or suffer deteriorated performance for existing calls, it would be desirable to move some of the traffic from the overloaded cell to the non-overloaded cell to balance the transmit power level in those cells. By transferring some of the traffic load from the high load cell, the transmit power level in that overloaded cell is decreased, which improves performance in the loaded cell. Performance is also improved in the underloaded cell because the transferred traffic means that the resources in the underloaded cell are more efficiently utilized. In addition, the service provided to the transferred mobile users is not interrupted, and newly requested services need not be denied.

One way of transferring traffic load from an overloaded cell is to lower the handover threshold in that cell. FIG. 1 shows three neighboring cells A–C. Cell A contains radio user equipment nodes A and B (UE-A and UE-B) and is currently in an overloaded condition. Cells B and C are not overloaded, and therefore have additional capacity. By lowering the handover threshold for overloaded cell A, the cell border of cell A is effectively reduced from the normal cell border to a smaller, "shed" cell border. Because user equipment A is outside the shed cell border, UE-A is handed over to one of cells B and C. By shedding user equipment connections from overloaded cell A to an underloaded cell (B or C), the traffic load between these three cells is balanced.

However, there are problems with changing the handover threshold in overloaded cell A to effect handover of UE-A to cell B or C. First, the uplink transmit power required (from UE to base station) to transmit signals from UE-A to the new cell B or C must increase in order to reach the base station in cell B or C. In other words, UE-A has a shorter distance to transmit in the uplink direction to the base station in cell A than it does to the base station in cell B for example. Having been handed over to cell B, UE-A must increase its transmit power to reach the base station in cell B. Uplink interference is increased as a result of the increased power of transmission in the uplink direction by UE-A. The increased interference causes other radio transmitters in cell A, B and C to increase their transmission power to compensate for the increased interference. The increases in transmission power by UE-A and these other radio transmitters further increase interference in surrounding cells. Second, because UE-A is required to increase its uplink transmit power, it consumes more battery power than if it were simply transmitting to closer cell A. Third, having to perform a handover of the connection from cell A to cell B requires added control signaling, and there is always a risk the connection may be lost.

It is an object of the present invention to provide a transmit power balancing scheme that optimizes the capacity of a mobile radio communications system.

It is a further object of the present invention to provide downlink transmit power balancing without increasing uplink interference.

It is still a further object to provide load balancing between overloaded and underloaded cells that does not require handover and handover control signaling.

The present invention solves the above-identified problems and meets these and other objectives using a transmit power balancing method that increases overall communication capacity without incurring substantial, additional control signaling. An overload condition in a first cell serviced by a radio network is detected, and a second nearby cell which is not overloaded is identified. For a radio user node that has a connection with the radio network, radio transmission from the first cell is prevented or at least avoided in a downlink direction from the radio network to the radio user node. Instead, a radio transmission associated with that connection is established or otherwise permitted from the second cell in the downlink direction to the radio user node. In a preferred example embodiment, the prevented or avoided downlink radio transmission is a traffic transmission. On the other hand, downlink control signaling associated with the connection from the first cell to the radio user node is permitted. Also, in the preferred example embodiment, radio transmissions from the radio user node to the first cell in the uplink direction are permitted, and preferably maintained, while transmissions in the downlink direction originate from the second cell.

In a more detailed, non-limiting example implementation of the invention, the radio network broadcasts to radio user nodes in or near the first cell an "avoid cell" message instructing radio user nodes either to avoid using or to not use the first cell for downlink transmissions. In response, a radio user node in the first cell can transmit an indicator to the radio network that downlink transmissions associated with the connection to the radio user node should preferably or necessarily be from the second cell depending on how the invention is implemented. In an implementation where the first cell is to be avoided, a scaling factor may be used to reduce the chances that the first cell is selected.

BRIEF DESCRIPTION OF THE DRAWINGS

The foregoing and other object, features, and advantages of the present invention may be more readily understood with reference to the following detailed description taken in conjunction with the accompanying drawings, wherein like reference numerals designate like structural elements, and in which.

DETAILED DESCRIPTION OF THE INVENTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be implemented in any cellular radio communications system. Although an example is provided below for a specific CDMA radio communications system, the invention is not limited to this example.

In some instances, detailed descriptions of well-known methods, interfaces, devices and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital Signal Processors (DSPs).

Figure 2:
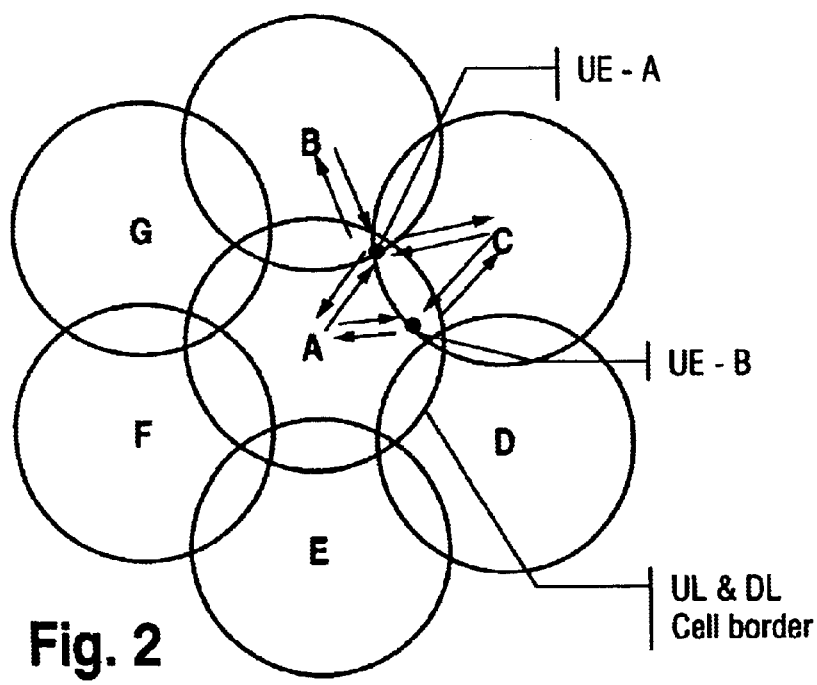
FIGS. 2 and 3 are diagrams of neighboring cells useful in describing the present invention.
Figure 3:
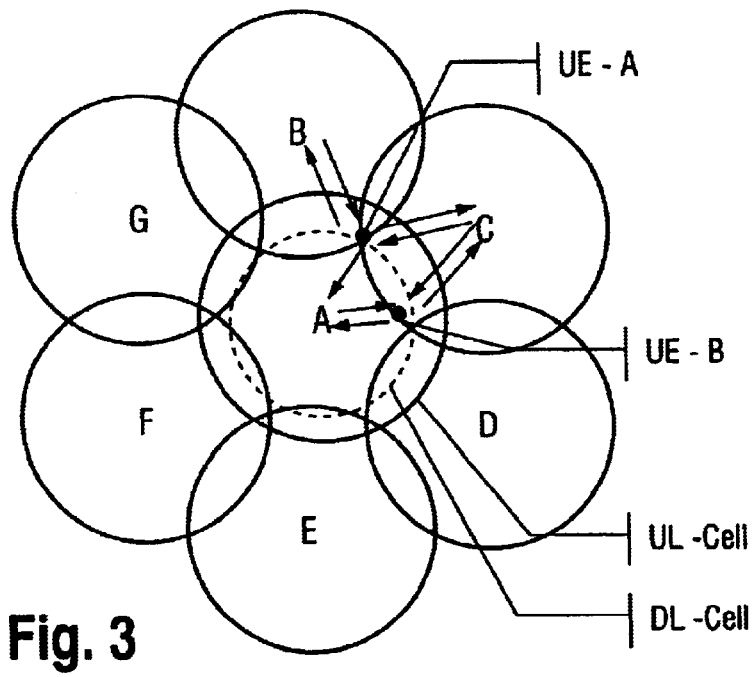

The invention optimizes downlink capacity using transmit power balancing between several cells without a handover, substantial additional control signaling, or an increase in uplink interference. Reference is made to FIGS. 2 and 3 for an illustrative example of the present invention. FIG. 2 shows a diagram of a plurality of cells A–F with two radio user equipment nodes (UE-A and UE-B) located at overlapping cells A, B, C, and D. The inventors of the present invention recognized that there may be different effective coverage areas in the downlink direction (from the radio network to the UE) and in the uplink direction (from the UE to the radio network). When there is no congestion in a cell, the uplink and downlink coverage areas or cell borders can be viewed as substantially the same. However, when an overload condition exists in cell A, as shown in FIG. 3, the present invention transfers downlink traffic from high load cell A to a less heavily loaded cell, such as one of cells B, C, or D, to balance the output power level in these cells. In other words, the downlink output power level in cell A is decreased while the downlink output power level in one of cells B, C, or D is increased. However, the uplink traffic load is maintained to avoid increased interference in cells A, B, C, or D and to avoid an unnecessary handover operation to cells B, C, or D. As a result, the overall system capacity on the downlink is increased without decreasing capacity for the uplink.

Figure 4:
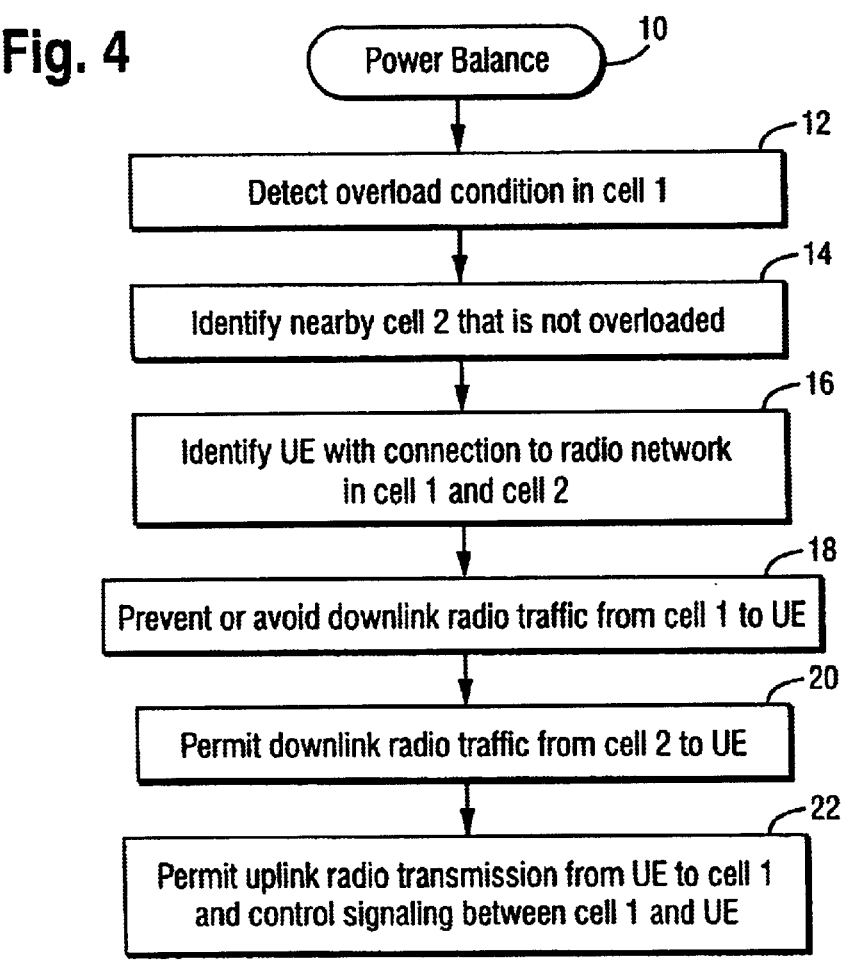
FIG. 4 is a flowchart diagram illustrating a transmit power balance routine in accordance with an example embodiment of the present invention.

FIG. 4 illustrates a power balancing routine (block 10) in accordance with the general example embodiment of the present invention. An overload condition is detected in the First cell 1 (block 12). A nearby cell 2 is identified that is not in an overload condition (block 14). A radio user equipment node is identified with the connection to the radio network in cell 1 and cell 2 (block 16). Downlink radio traffic transmission is avoided, and if desired, prevented from cell 1 to the user equipment node (block 18). For example, a base station controller simply instructs the base station in cell 1 not to transmit traffic to the user equipment node. However, the term "avoid" is used in the drawing because there may be circumstances where it may be desirable or even necessary to permit downlink transmission. Downlink radio traffic transmission is permitted in the underloaded cell 2 to the user equipment (block 20). Uplink radio transmissions from the user equipment to cell 1, as well as control signaling between cell 1 and the user equipment, are permitted (block 22). However, the UE transmits on the uplink without knowing which base station listens to the uplink message. Accordingly, there is no decision in the UE to transmit or not transmit to a specific base station.

Figure 1:
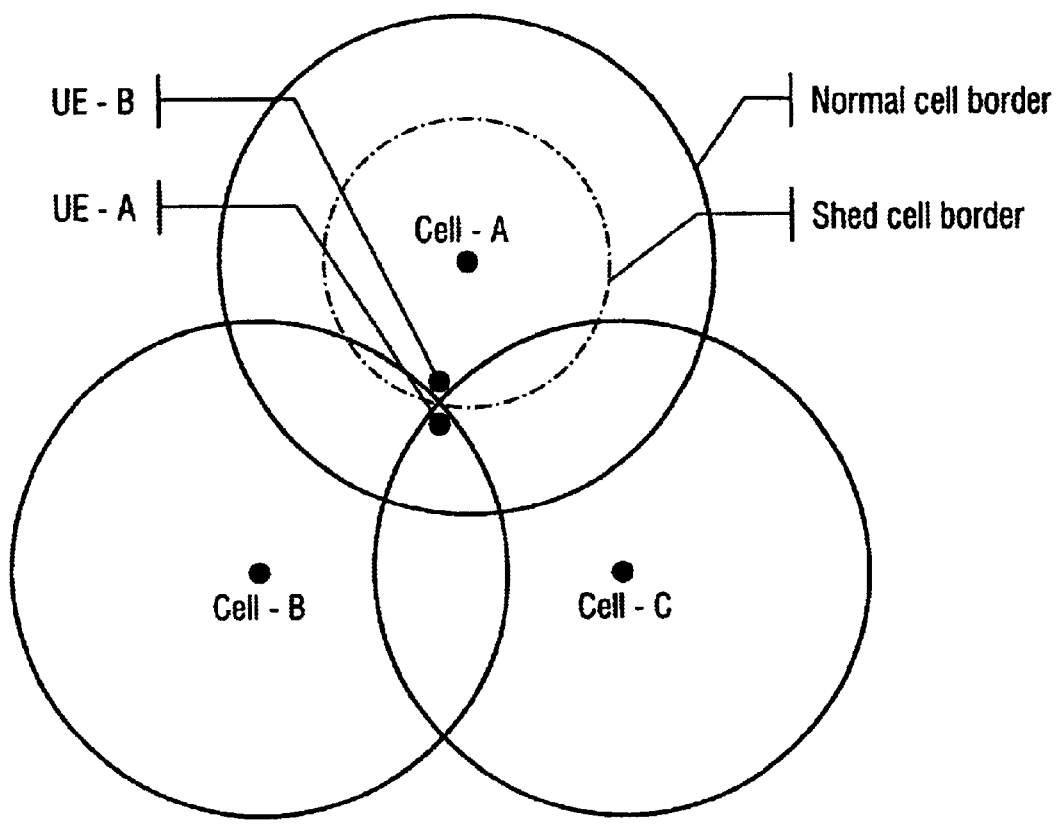
FIG. 1 is a diagram illustrating three neighboring cells in which an overload condition in cell A is controlled by reducing a handover threshold to shed some of the traffic load to neighboring cells B or C.

Because uplink radio and control signaling transmissions are permitted, the radio user equipment does not have to increase its transmit power in the uplink direction to reach the base station in cell 2 which is farther away from the user equipment than the base station in cell 1. This ensures the uplink interference is not increased to the detriment of other communication. User equipment battery is also conserved. This is also true for the control signaling load in the downlink direction from the base station in cell 1 to the user equipment. That downlink control signaling does not need to be increased as it would be if the downlink control signaling were sent from the base station in cell 2 which is further away from the user equipment. Still further, there is no need to orchestrate a handover procedure which increases signaling overhead and always has the risk of losing a call. Nor is there a need to change the handover parameters which trigger a handover as would be required if the approach taken in FIG. 1 were adopted.

Figure 5:
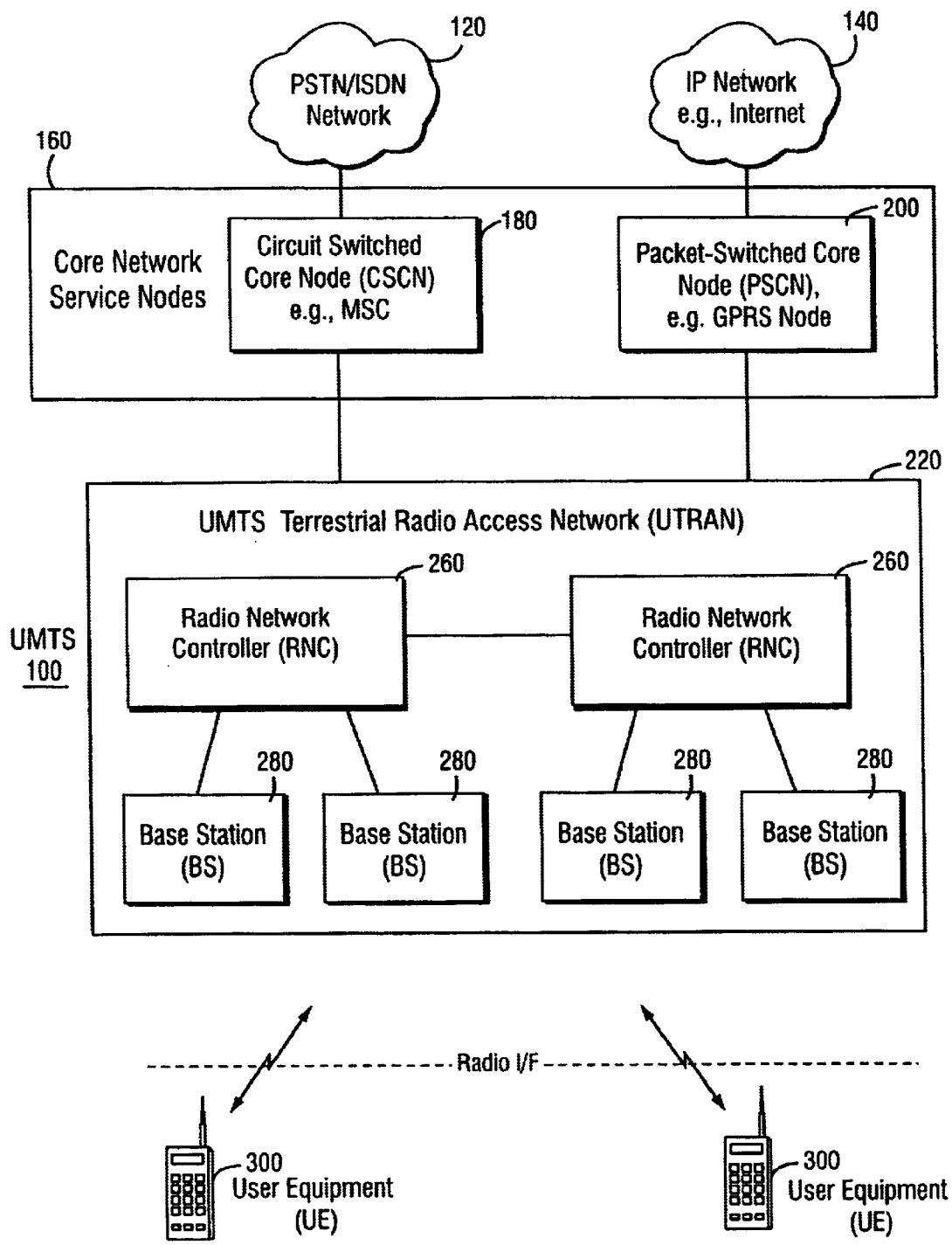
FIG. 5 illustrates an example communications network in which the present invention may be employed.

The present invention finds particular (although not limiting) application to a Universal Mobile Telecommunications System (UMTS) such as that shown at reference numeral 100 in FIG. 5. A representative, circuit-switched core network, shown as cloud 120, may be for example the Public Switched Telephone Network (PSTN) or the Integrated Services Digital Network (ISDN). A representative, packet-switched core network, shown as cloud 140, may be for example an IP network like the Internet. Both core networks are coupled to corresponding core network service nodes 160. The PSTN/ISDN circuit-switched network 120 is connected to a circuit-switched service node shown as a Mobile Switching Center (MSC) 180 that provide circuit-switched services. The packet-switched network 140 is connected to a General Packet Radio Service (GPRS) node 200 tailored to provide packet-switched type services.

Each of the core network service nodes 180 and 200 connects to a UMTS Terrestrial Radio Access Network (UTRAN) 240 that includes one or more Radio Network Controllers (RNCs) 260. Each RNC is connected to a plurality of Base Stations (BSs) 280 and to other RNCs in the UTRAN 220. Each base station 280 corresponds to one access point (one sector or cell) or includes plural access points. Radio communications between one or more base station access points and a Mobile Terminal (MT) 300 (one type of wireless UE) are by way of a radio interface. A mobile terminal is an example of a wireless user equipment. Radio access in this non-limiting example is based on Wideband-CDMA (W-CDMA) with individual radio channels distinguished using spreading codes. Wideband-CDMA provides wide radio bandwidth for multi-media services including packet data applications that have high data rate/bandwidth requirements. One scenario in which high speed data may need to be transmitted downlink from the UTRAN over the radio interface to a mobile terminal is when the mobile terminal requests information from a computer attached to the Internet, e.g., a website.

Figure 6:
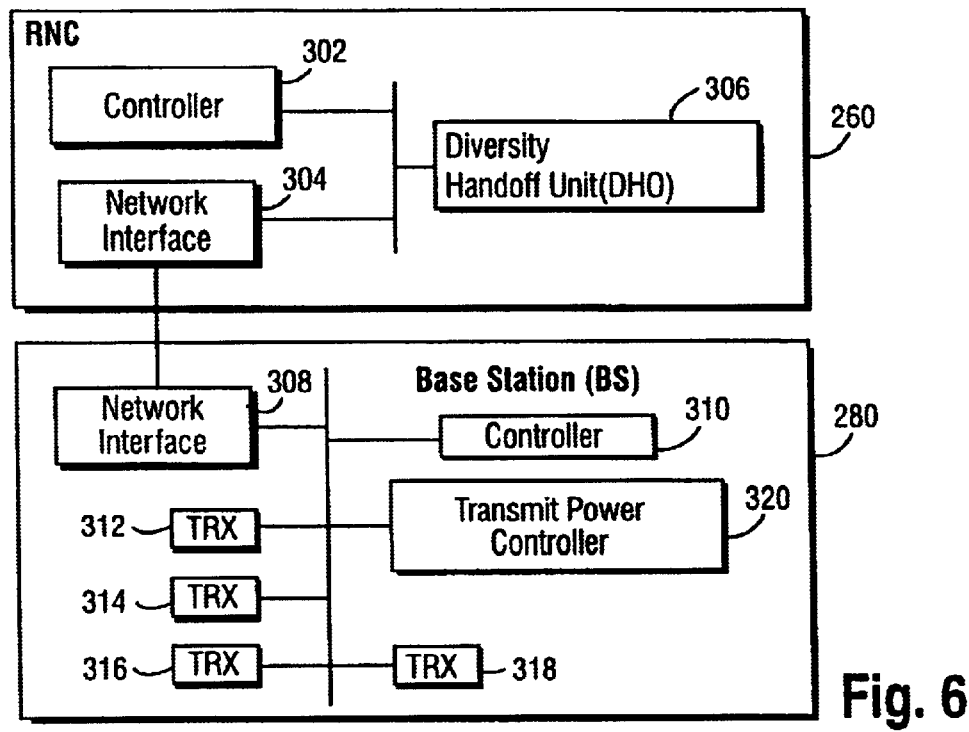
FIGS. 6 is a block diagram of an RNC and a base station shown in FIG. 5.
Figure 7:
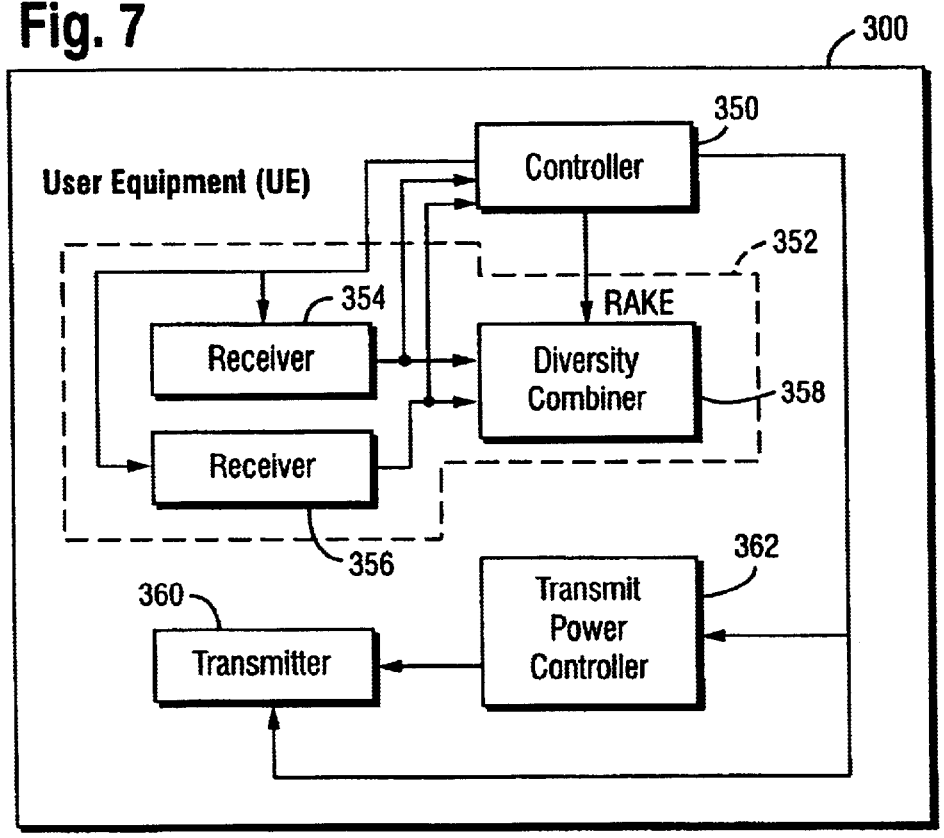
FIG. 7 is a block diagram of a radio user equipment node shown in FIG. 5.

Additional details of a base station and a radio network controller are now provided in conjunction with FIG. 6 and the radio user equipment node in conjunction with FIG. 7. Each radio network controller (RNC) 260 includes a network interface 304 for interfacing communications with various base stations. Within the RNC 260, the network interface 304 is connected to a controller 302 and to a diversity handover unit (DHO) 306. Diversity handover unit 306 performs functions required for establishing, maintaining, and dropping diversity handover connections.

Each base station 280 includes a corresponding network interface 308 for interfacing with the RNC 260. In addition, the base station includes a controller 310 connected to a plurality of transceivers (TRX) 314, 316, and 318, as well as a transmit power controller 320. Controller 310 controls the overall operation of the base station. Representative transceivers 314–318 are individually assigned to specific communications with mobile stations. At least one transceiver is employed as a common control channel over which the base station transmits common signaling such as a pilot signal or a PERCH signal. The common channel is monitored by mobile stations within or near that base station's cell, and is also used to request a working channel (uplink) or to page a mobile station (downlink). Transmit power controller 320 participates in downlink power control procedures. In particular, signal strength and/or signal quality measurements (Pike signal-to-interference ratio) are determined by the transmit power controller 320 using information relating to received signals provided by the transceivers 312–318. With this information and information received from the RNC 260, the controller 310 and the transmit power controller 320 determine the power level of transmissions from the transceivers 312–318.

Referring now to FIG. 7, radio user equipment node 300 includes a controller 350 connected to a RAKE receiver 352, a transmit power controller 362, and a transmitter 360. The mobile station's transmit power controller 362 uses uplink power control commands from the one or more base stations to adjust the mobile's uplink transmit power up or down by an appropriate increment in accordance with the received commands. The RAKE receiver 352 includes plural receivers 354 and 356 (there may be additional receivers as well) connected to a diversity combiner 358. The transmissions from one or more base stations are received as multipath in the receivers 354 and 356, combined in a diversity combiner 358, and processed as one signal. Controller 350 determines received signal strength (RSS) and/or signal quality, e.g., signal-to-interference ratio (SIR), values of received signals. Based upon the RSS or SIR measurements of the diversity-combined signal, the controller 350 generates transmit power control indicators or commands and transmits them via transmitter 360 to base stations in its active base station candidate list.

In a non-limiting, example of the present invention described in the context of the cellular radio communications system shown in FIG. 5, one or more radio network controllers monitors the downlink transmit power level for traffic channels in all cells. Once that power level in a cell exceeds a certain threshold, e.g., a percentage of the maximum load for that cell, the associated RNC investigates which radio user equipment nodes have a connection leg in the overloaded cell. The earlier example implementation used control signals from a base station controller, (similar to but not limited to an RNC), to instruct a base station in the overloaded cell not to transmit traffic to the UE node. This example implementation also involves the UE node in the process.

The radio network controller broadcasts a message to the user equipment nodes that have a leg in the overloaded cell to avoid (or if desired, to completely abstain from) using that highly loaded cell. For example, a "cell avoid" message is sent as a cell control indicator in a protocol level 3 message to all user equipment nodes having a leg in the overloaded cell. For other user equipment nodes that attempt to establish a new connection to the overloaded cell, the cell control indicator is provided to that user equipment node in the normal connection establishment control signaling. In effect, the cell control message informs radio user equipment nodes that a certain cell in that user equipment's active set should be avoided. The user equipment then measures the received signal strength or signal quality for all cells in its active set and chooses the cell with the highest received signal strength or quality. Preferably, the user equipment node selects the "best" cell for each transmission frame, e.g., greatest RSS, SIR, etc. The user equipment measures a downlink transmission from all cells in its candidate set, for example, the common channel pilot signal transmitted by the base station in each cell.

One example way for the UE node to make the selection is to "scale" the received signal strength or signal quality from the overloaded cell using a factor less than one, e.g., 0.8. The scaling factor may be adjusted so that it decreases as the load in the overloaded cell increases. As a result of such scaling, the received signal strength or signal quality from the overloaded cell needs to be considerably better than the other cells in the active set to be selected. For example, if the scaling factor is 0.5 for an overloaded cell, that overloaded cell would have to have a signal strength or quality measurement that is twice as good as a neighboring cell that is not overloaded in order to be selected by the mobile station. This permits use of an overloaded cell for several frames if it is the only option. Alternatively, multiple load thresholds and corresponding multiple scaling factors can be used. The scaling factor may also depend on the type of service being rendered to the user equipment such as voice, data, video, etc.

Once the cell selection is made by the radio user equipment node using the cell control indicator message, the radio user equipment node may transmit a cell or site selection indicator message on the uplink to select one or more uncongested cells preventing downlink transmissions from the overloaded cell. In essence, the base station sends a message to the user equipment that among the available cells in the active set to avoid using a soft handover leg to the congested cell. Based on that received message, the user equipment sends a message on the uplink, such as a site selection diversity (SSDT) indicator, to identify the cell that will send the downlink transmission to the user equipment for a particular frame.

Consider the following example based on Table 1 below:

TABLE 1

| Downlink power % of max. | Cell 1 20 | Cell 2 30 | Cell 3 75 | Cell 4 40 | Cell 5 10 | Cell 6 80 | Cell 7 20 |
|---|---|---|---|---|---|---|---|
| UE1 | X | X | X | | | | |
| UE2 | X | X | | X | | | |
| UE3 | | X | | X | X | | |
| UE4 | | | X | X | | X | |
| UE5 | | | | | X | X | X |
| UE6 | X | X | | | | | X |
| UE7 | X | | | | | X | X |

The horizontal axis lists cells 1–7, and the vertical axis lists the radio user equipment nodes. Each user equipment node has an active set that specifies all cells to which the user equipment node is coupled, i.e., it has a soft handover leg to that cell. The active set for the user equipment node is indicated by X's.

Assume that the cell load threshold is set to seventy percent of the downlink maximum. Different load thresholds may be set for different cells. Cells 3 and cell 6 are therefore considered overloaded. For each overloaded cell, the RNC controller determines which user equipment nodes have a soft handover leg in that overloaded cell. In this example, each user equipment node has an active set of three cells. For each user equipment node with a soft handover leg in the overloaded cell, i.e., the overloaded cell is in that user equipment node's active set, an "avoid cell" message is transmitted from the RNC to cell base stations. Such an avoid cell message can simply be a flag indicating that the cell should be avoided. As a result, the base station in the overloaded cell simply does not send downlink traffic transmissions to that cell.

The avoid cell message may also be sent to the UEs. A user equipment node can respond to the avoid cell message by simply scaling down a received signal strength or signal quality measurement detected for the overloaded cell. When the user equipment compares the received signal strength/signal quality measurement on all cells in its active set, the scaled down value corresponding to the congested cell makes it unlikely the congested cell is selected.

In this example in Table 1, user equipment nodes 1 and 4 include a handover leg connection in cell 3. User equipment node UE1 can select cells 1 and/or 2 to transmit traffic in the downlink direction to UE1. User equipment node UE4 has two active set cells 3 and 6 in an overload condition. Therefore, cell 4, which is the only unloaded cell in UE4's active set, is selected for downlink traffic communication or is at least preferred for downlink traffic transmissions.

In both situations, the transmit power load on traffic channels in cells 3 and 6 is reduced, while the downlink traffic load is increased in traffic cells 1, 2, and 4. Since the downlink traffic power in cells 1, 2, and 4 is considerably below the overloaded threshold, this redistribution achieves more uniform transmit power balancing resulting in increased capacity. Moreover, this power balancing is achieved without increasing uplink signaling or requiring a handover. The uplink traffic transmission from the user equipment to the base station is maintained at a lower power level, as can be seen in the example in FIG. 3, because user equipment UE-A and UE-B are closer to the base station in overloaded cell A than in underloaded cells B and C. In addition, control signaling can still be maintained in both uplink and downlink directions between the user equipment and the closest cell. One non-limiting example of information included in a traffic transmission in the UTRAN of FIG. 5 includes user information carried by logical traffic channels, and if desired, also some control information between the RNC and UE carried by a control channel. An example of downlink control signaling might include pilot information and transmit power control information. Of course, traffic transmissions may be configured to only include user information, and control signaling may be configured, if desired, to include some minimal user information.

Figure 8:
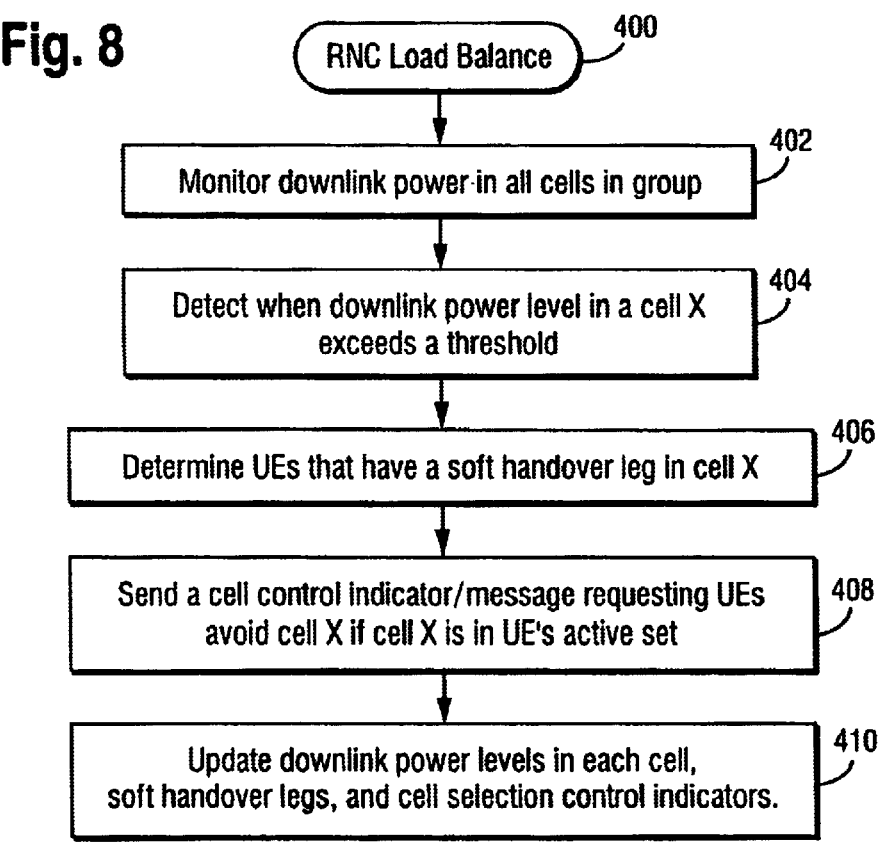
FIG. 8 is flowchart diagram illustrating an RNC node load balancing routine in accordance with one aspect of the present invention as applied to the communication system shown in FIG. 5.

FIG. 8 illustrates an RNC load balance routine (block 400). First, the RNC monitors the downlink power in all cells in a group for which the RNC is responsible (block 402). The RNC detects when the downlink traffic power level in a particular cell from that group exceeds an overload threshold (block 404). Once an overload condition in cell X is detected, the RNC determines which user equipment nodes have a soft handover leg in cell X (block 406). The RNC then sends a cell control indicator or message via its corresponding base stations thereby requesting user equipment nodes to avoid cell X for downlink traffic if cell X is in the user equipment node's active set (block 408). The RNC then continues to update downlink power traffic levels in each cell, monitor soft handover legs, and provide cell control indicators in accordance with the previous steps (block 410).

Figure 9:
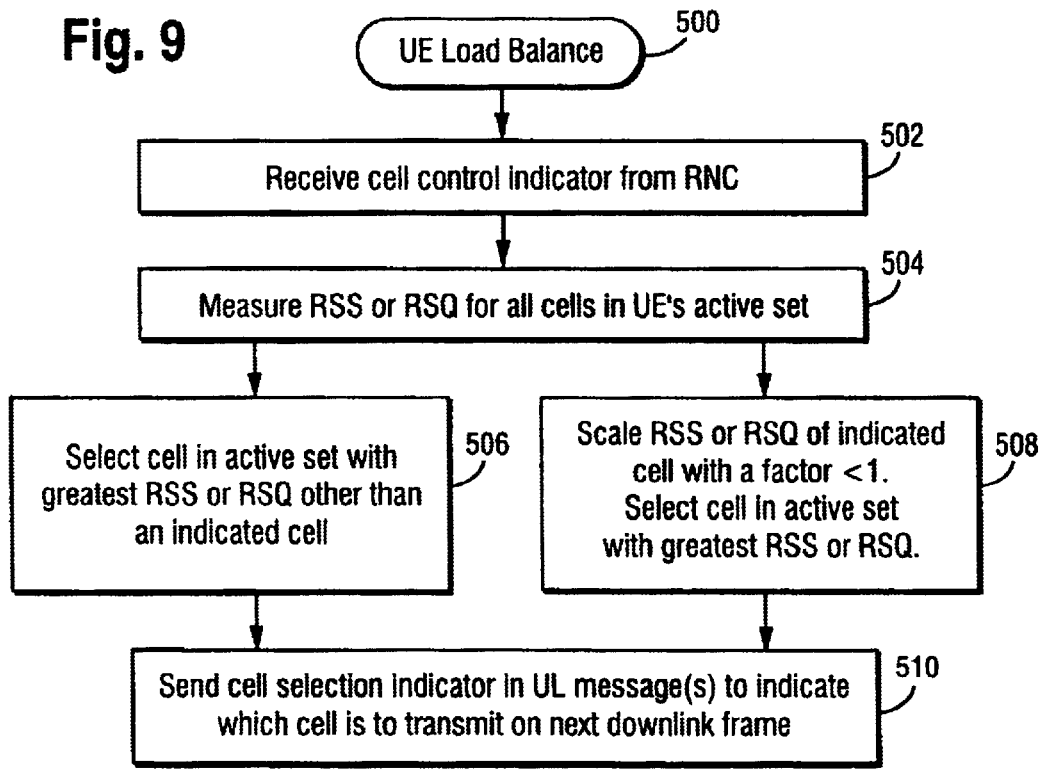
FIG. 9 is a user equipment load balance routine in accordance with another aspect of the present invention as applied to the communication system of FIG. 5.

A user equipment load balance routine (block 500) is now described in conjunction with FIG. 9. The user equipment node receives a cell control indicator message generated by the radio network control node via one or more base stations block 502). The user equipment node measures the received signal strength (RSS) or received signal quality (RSQ) for all cells in the user equipment node's active set block 504). In one example implementation, the user equipment selects the cell in its active set with the greatest RSS or RSQ, but does not consider the overloaded cell indicated in the cell control message (block 506). Alternatively, the user equipment may scale the RSS or RSQ of the indicated overloaded cell with a scaling factor less than one. After scaling, the user equipment then selects a cell in its active set with the greatest RSS or RSQ where the overloaded cell is included but with a "discounted" RSS or RSQ, making it unlikely that the overloaded cell will be selected. However, the overloaded cell is still available for selection if necessary. Once a particular cell is selected by the user equipment to transmit downlink traffic to the user equipment for a particular frame, the user equipment sends a corresponding cell selection indicator in an uplink message to the base stations in its active set to indicate which cell is to transmit traffic on the next downlink frame (block 510). As mentioned above, the user equipment node maintains uplink traffic transmission to the congested cell even though the congested cell does not or avoids transmitting to the UE node.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Accordingly, it is intended that the invention be limited only by the scope of the claims appended hereto.

What is claimed is:

1. In a radio communications system for conducting communication between a radio network and radio user nodes over a radio interface, a method comprising:
   detecting a first load condition in a first cell area serviced by the radio network;
   identifying a second cell nearby the first cell having a second load condition;
   identifying a radio user node with a connection with the radio network;
   avoiding a radio transmission associated with the connection from the first cell in a downlink direction to the radio user node;
   permitting a radio transmission associated with the connection from the second cell in the downlink direction; and
   receiving an uplink transmission from the radio user node in the first cell.

2. The method in claim 1, wherein the first load condition is an overload condition and the second load condition is not an overload condition.

3. The method in claim 1, wherein the uplink transmission indicates that downlink transmission should be from the second cell.

4. The method in claim 1, wherein the prevented radio transmission is a traffic type of radio transmission, the method further comprising;
   transmitting a control signal radio transmission associated with the connection from the first cell to the radio user node in the downlink direction.

5. The method in claim 1, further comprising:
   broadcasting to radio user nodes in or near the first cell a scaling factor for scaling a cell parameter value measured by the radio user nodes in the first cell.

6. The method in claim 5, wherein the cell parameter is received signal strength or signal quality.

7. The method in 1, wherein the avoiding step includes preventing radio transmission associated with the connection from the first cell to the radio user node.

8. In a radio communications system for conducting communication between a radio network and radio user nodes over a radio interface, a method comprising;
   detecting a first load condition in a first cell area serviced by the radio network;
   identifying a second cell nearby the first cell having a second load condition;
   identifying a radio user node with a soft handover connection with the radio network with a first leg between the first cell and the radio user node and a second leg between the second cell and the radio user node;
   avoiding a radio transmission associated with the connection from the first cell in a downlink direction to the radio user node;
   permitting a radio transmission associated with the connection from the second cell in the downlink direction; and
   maintaining transmission over the first leg to the first cell in an uplink direction from the radio user node to the first cell.

9. In a radio communications system for conducting communication between a radio network and radio user nodes over a radio interface, a method comprising;
   detecting a first load condition in a first cell area serviced by the radio network;

identifying a second cell nearby the first cell having a second load condition;

identifying a radio user node with a connection with the radio network;

avoiding a radio transmission associated with the connection from the first cell in a downlink direction to the radio user node;

permitting a radio transmission associated with the connection from the second cell in the downlink direction; and broadcasting to radio user nodes in or near the first cell an avoid cell message in order to cause the radio user nodes to avoid using the first cell for downlink transmissions.

10. In a radio communications system for conducting communication between a radio network and radio user nodes over a radio interface, apparatus for use in the radio network, comprising:

a detector for detecting a first load condition in a first cell area serviced by the radio network and a second load condition in a second cell nearby the first cell, and a controller configured to perform the following tasks:
to avoid radio transmissions associated with a connection between a radio user node and the radio network from the first cell in a downlink direction to the radio user node, and to permit a radio transmission associated with the connection from the second cell in the downlink direction, and an uplink transmission from the radio user node in the first cell.

11. The apparatus in claim 10, wherein the first load condition is an overload condition and the second load condition is not an overload condition.

12. The apparatus in claim 10, wherein the uplink transmission indicates that downlink transmission should be from the second cell.

13. The apparatus in claim 10, wherein the prevented radio transmission is a traffic type of radio transmission, the controller is configured to perform the further task of:

transmitting a control signal radio transmission associated with the connection from the first cell to the radio user node in the downlink direction.

14. The apparatus in claim 13, wherein the cell parameter is received signal strength or signal quality.

15. The apparatus in claim 10, wherein the controller is configured to perform the further task of:

broadcasting to radio user nodes in or near the first cell a scaling factor for scaling a cell parameter value measured by the radio user nodes in the first cell.

16. The apparatus of claim 10, wherein the controller is configured to prevent radio traffic transmissions from the first cell to the radio user node.

17. The apparatus in claim 16, further comprising.

a detector configured to detect a signal parameter of signals received from cells in an active set of cells including the first cell, wherein the controller is configured to select the cell in the active set that has the highest detected signal parameter value.

18. The apparatus in claim 17, wherein the signal parameter is received signal strength or signal quality.

19. The apparatus in claim 17, wherein the controller is configured to scale the signal parameter value corresponding to the first cell to reduce the signal parameter value corresponding to the first cell.

20. The apparatus in claim 19, wherein the controller is configured to scale the signal parameter value corresponding to the first cell in accordance with the level of congestion in the first cell.

21. The apparatus in claim 20, wherein the controller is configured to reduce the signal parameter value corresponding to the first cell as the congestion level in the first cell increases.

22. In a radio communications system for conducting communication between a radio network and radio user nodes over a radio interface, apparatus for use in the radio network, comprising:

a detector for detecting a first load condition in a first cell area serviced by the radio network and a second load condition in a second cell nearby the first cell, and a controller configured to perform the following tasks with respect to a handover connection with a first leg between the first cell and the radio user node and a second leg between the second cell and the radio user node:

to avoid radio transmissions associated with the handover connection between a radio user node and the radio network from the first cell in a downlink direction to the radio user node, and to permit a radio transmission associated with the handover connection from the second cell in the downlink direction over the second leg and a radio transmission over the first leg to the first cell in an uplink direction from the radio user node to the first cell.

23. In a radio communications system for conducting communication between a radio network and radio user nodes over a radio interface apparatus for use in the radio network, comprising:

a detector for detecting a first load condition in a first cell area serviced by the radio network and a second load condition in a second cell nearby the first cell, and a controller configured to perform the following tasks:

to avoid radio transmissions associated with a connection between a radio user node and the radio network from the first cell in a downlink direction to the radio user node;

to permit a radio transmission associated with the connection from the second cell in the downlink direction; and to broadcast to radio user nodes in or near the first cell an avoid cell message in order to cause the radio user nodes to avoid using the first cell for downlink transmissions.

24. In a radio communications system for conducting communication between a radio network and radio user nodes over a radio interface, apparatus for use in a radio user node, comprising:

a radio receiver configured to receive cell selection control information from the radio network identifying a first cell; and a controller configured to identify an active set of cells including the first cell and to select a cell from the active set other than the first cell to transmit traffic information to the user equipment in response to the cell selection control information, wherein the radio receiver is further configured to receive a transmitted cell selection indicator identifying the selected cell.

25. The apparatus in claim 24, further comprising:

a radio transmitter configured to transmit traffic information from the user equipment to the first cell.

26. The apparatus in claim 24, further comprising:

a radio transmitter configured to transmit control information to and from the user equipment to the first cell.

27. The apparatus in claim 24, further comprising:

a detector configured to detect a signal parameter value of signals received from cells in the active set of cells, wherein the controller is configured to select the cell in the active set other than the first cell that has the highest detected signal parameter value.

28. The apparatus in claim 24, wherein the signal parameter is signal strength or signal quality.

29. The apparatus in claim 24, wherein the controller is further configured to process the cell selection control information, to adjust a signal parameter value corresponding to the first cell in response to the cell selection control information, and to select a cell from the active set to transmit traffic information to the user equipment; and a radio transmitter configured to transmit the selected cell to the radio network.

30. The apparatus in claim 29, wherein the radio transmitter is configured to transmit traffic information from the user equipment to the first cell.

31. The apparatus in claim 30, wherein the radio receiver is configured to receive control information from the first cell.

* * * * *